3,115,100
RAILWAY AUXILIARY TRUCK
Robert N. Janeway, Detroit, Mich., assignor to Consolidated Foundries and Mfg. Corp., Chicago, Ill.
Filed Jan. 29, 1959, Ser. No. 789,981
Claims priority, application Republic of South Africa Nov. 19, 1958
3 Claims. (Cl. 105—174)

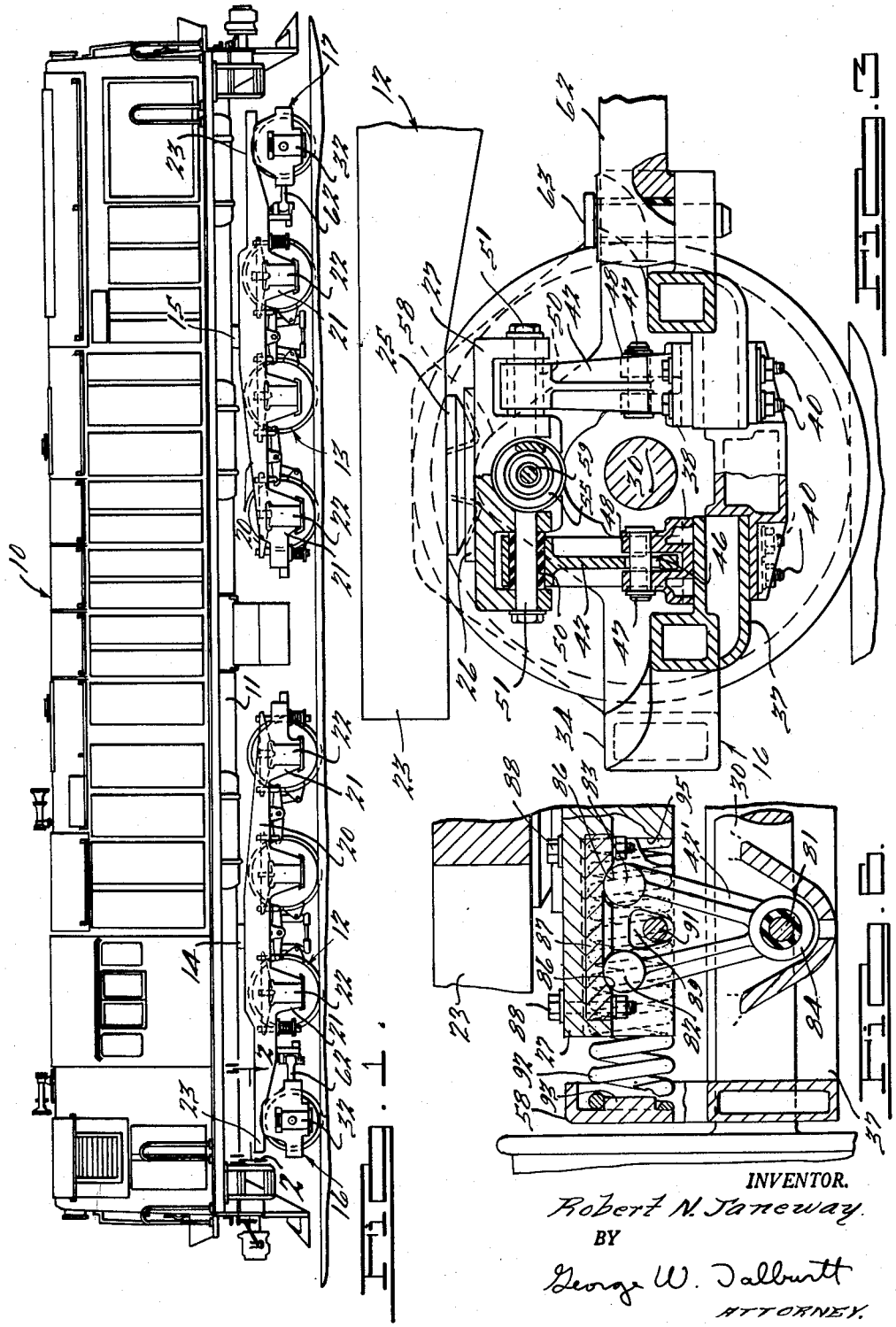

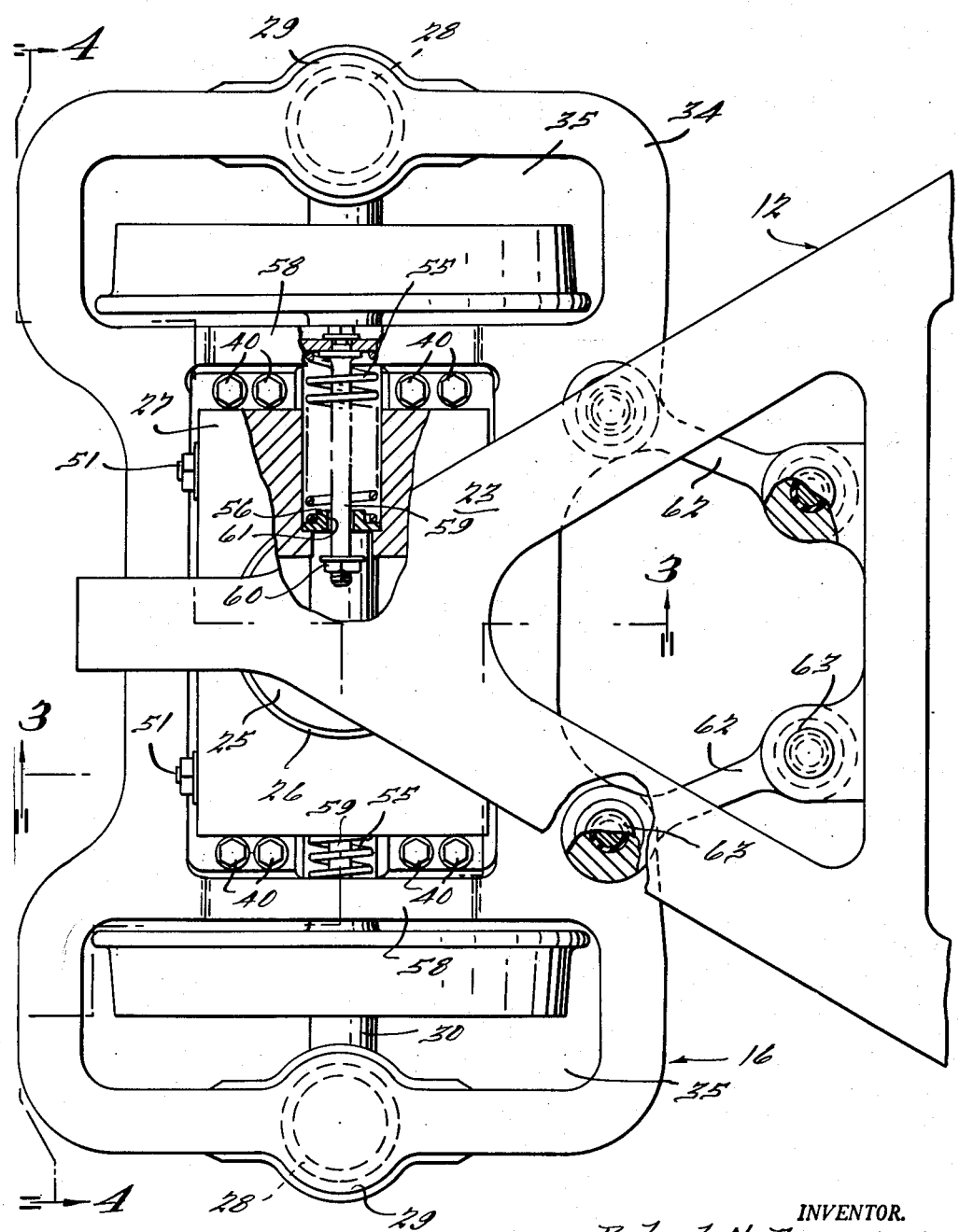

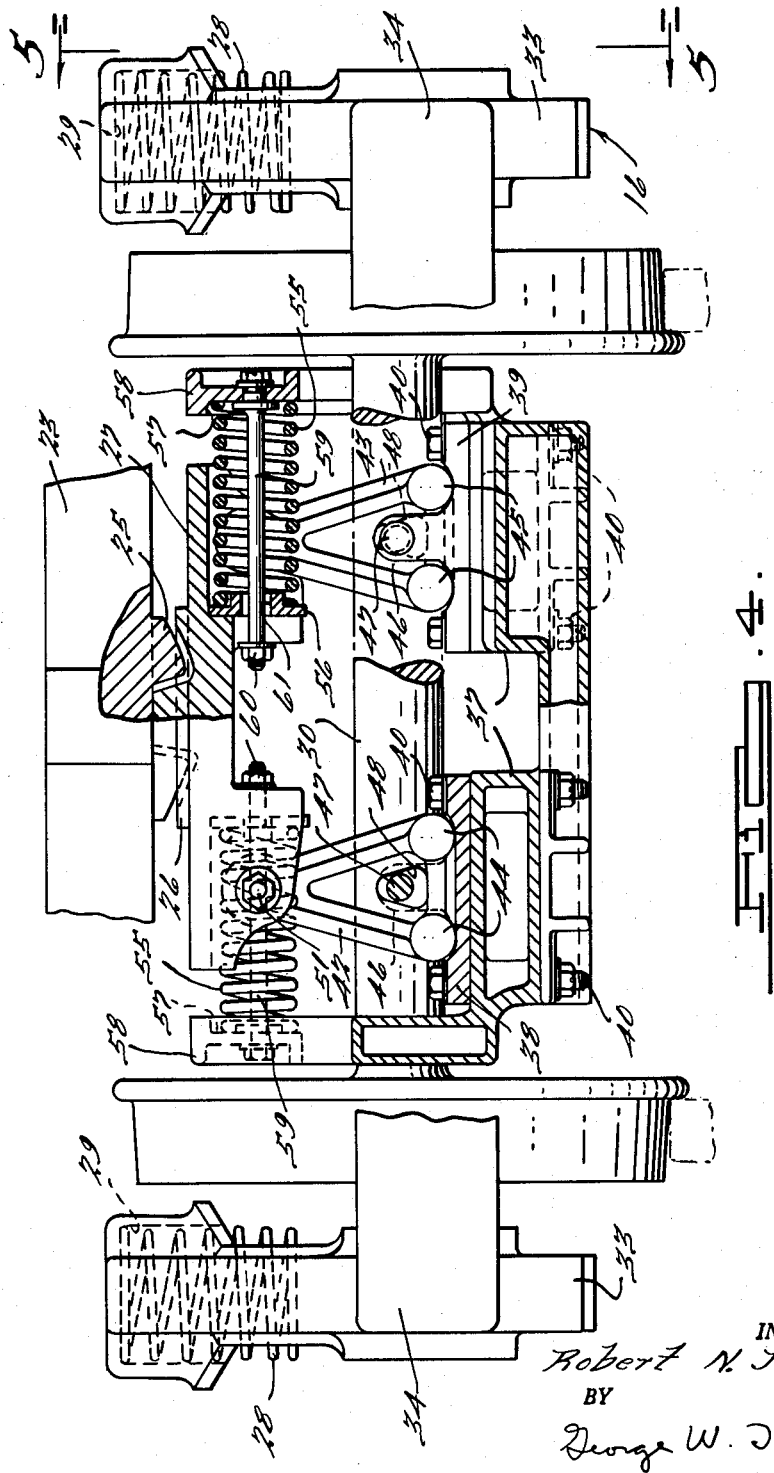

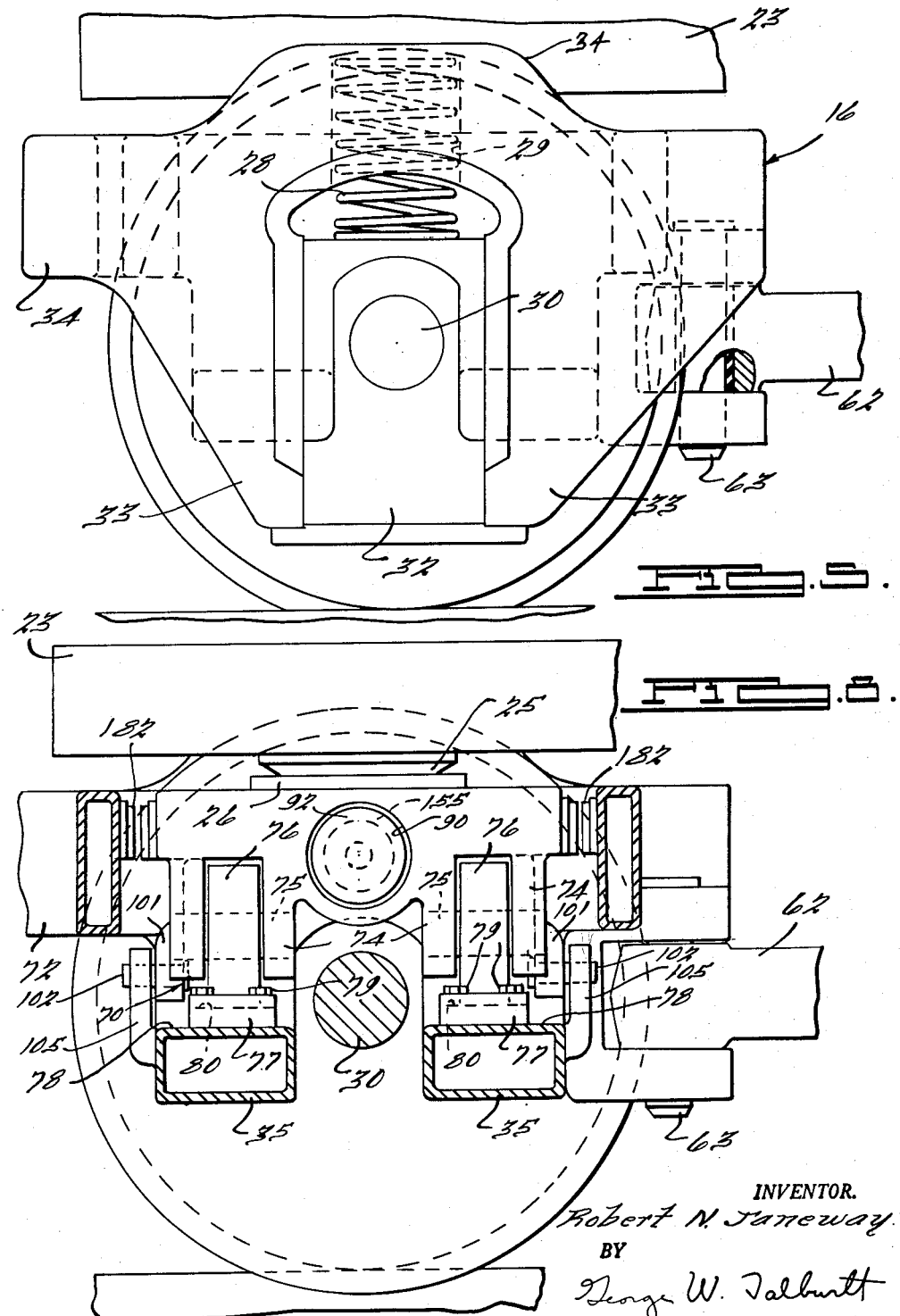

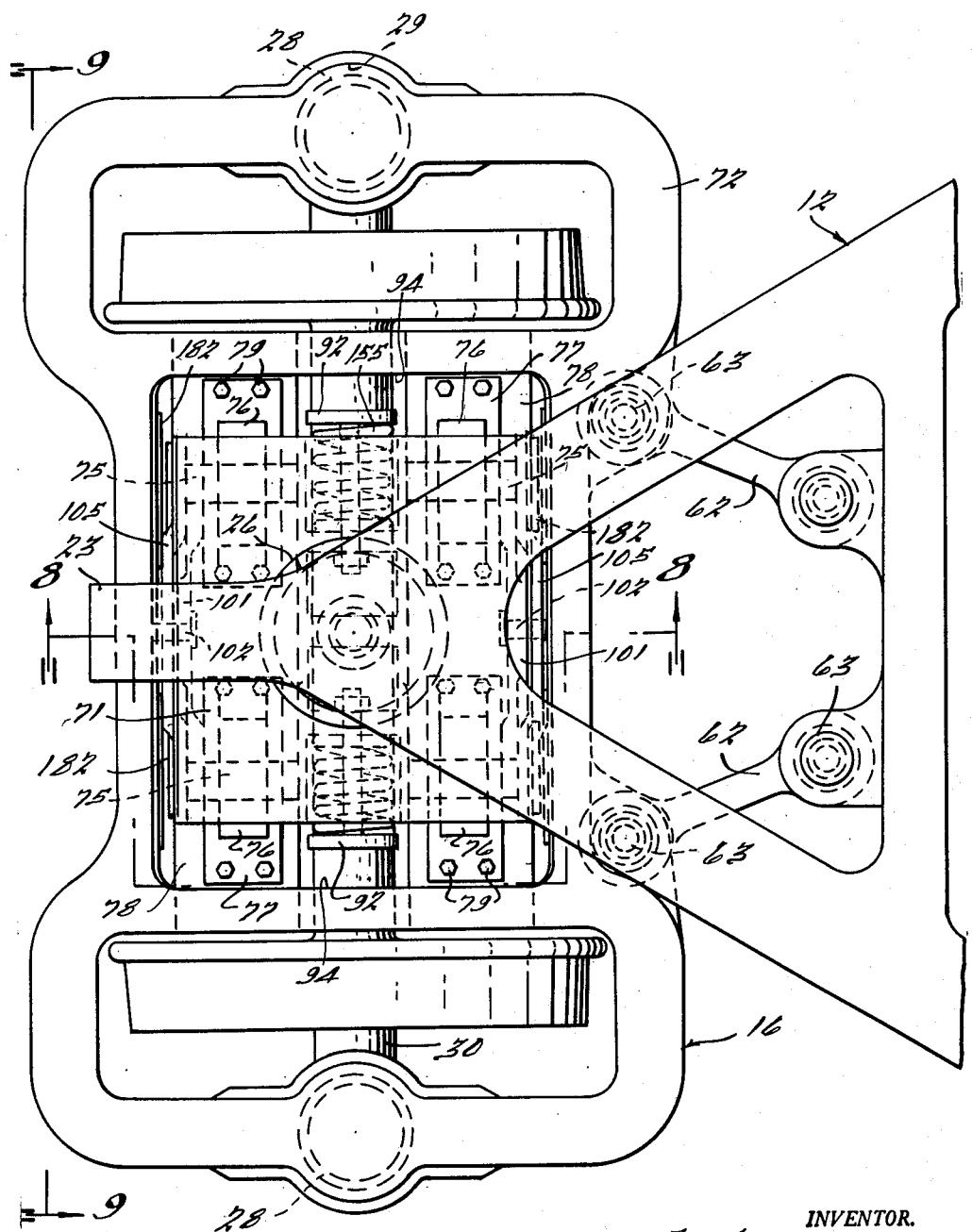

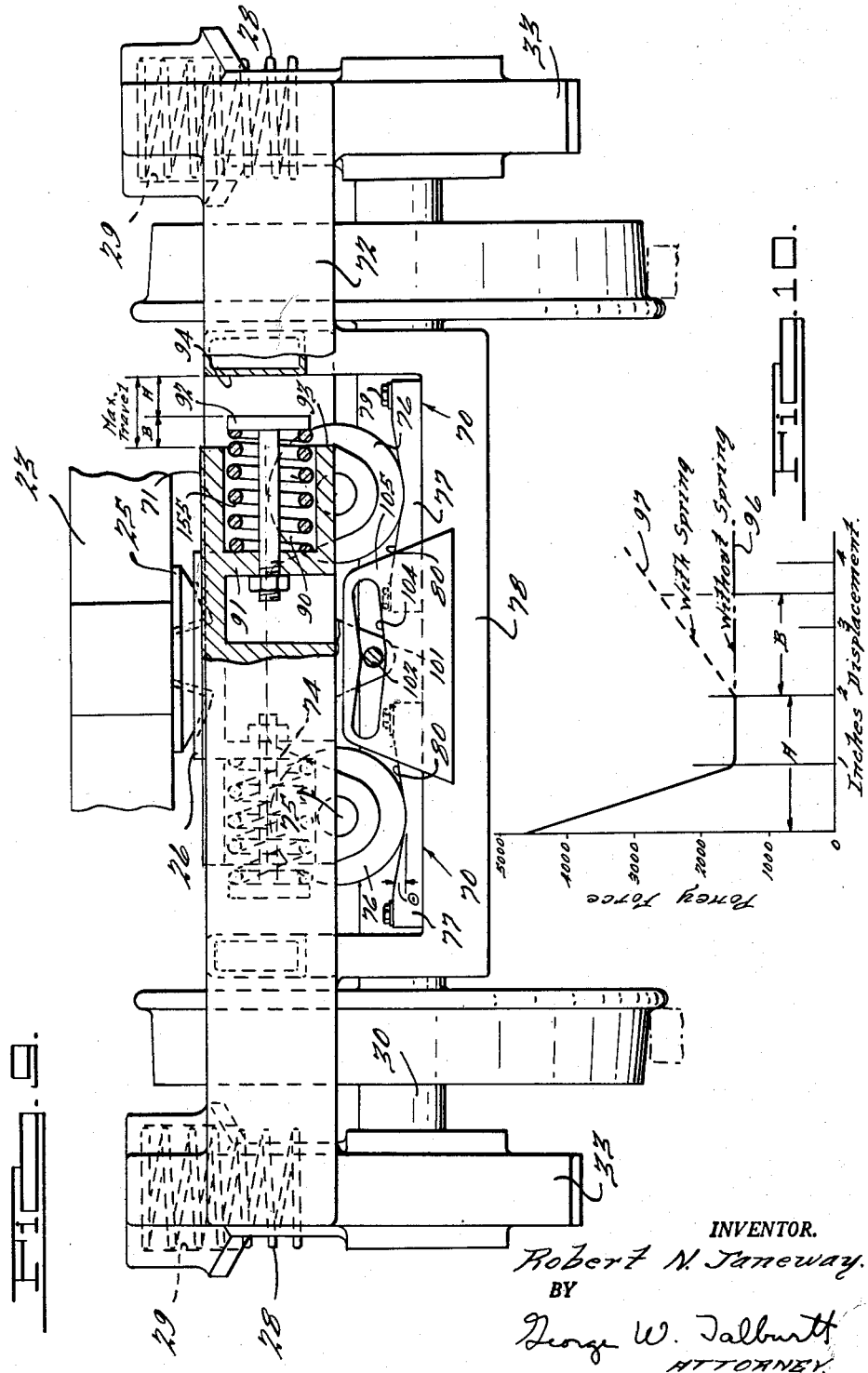

This invention relates to railway vehicles or trucks of the kind in which the leading or trailing axle, or each of them, is carried on a pony or auxiliary truck frame which is pivotally connected to the truck main frame about a vertical axis.

In order for the auxiliary or pony truck axle to follow rail curves, it is necessary to permit the pony truck frame a lateral displacement relatively to the main frame; and this is in practice achieved by for instance connecting the main and pony frames by a pair of vertically disposed, triangularly or V-shaped rocker links wherein the apex portion of the links are pivoted to either the bolster or the frame of the pony truck and wherein the free ends of the rocker link limbs are constrained within pockets in either the pony frame or bolster somewhat in the manner of ball and socket joints.

When the V-shaped rocker links are arranged with the apex portions downwardly disposed and pivotally connected to the pony frame and the free ends of the rocker links having their bearing portions seated in bearing plates attached to the bolster, there is little danger of dirt or foreign matter becoming lodged in the bearing plate journals and adversely affecting the operation of the links.

Lateral displacement of the pony frame is imposed on it when the reactive force of the rail on the pony truck wheel that is radially outermost when the vehicle enters a curve, becomes equal to the initial resistance imposed by the load on the rocker link.

When the vehicle resumes a straight course, it is essential that the pony truck wheels be coerced to return to a central position, since there is inherently no tendency for the wheels to do so. If rocker links are used, they may, to some extent, impose a centralizing force on the pony truck wheels due to their tendency to return gravitationally to the vertical, but this is not of itself adequate in all circumstances, because the centralizing force proportionately diminishes as the extent of lateral displacement increases.

In current practice it has been common to use rocker links on pony trucks that are biased to the central position by means of cams which impose on the links a progressively greater resistance to displacement as the wheels are displaced transversely. While this expedient tends to achieve its object, it is at the cost of a high rate of cam wear which necessitates frequent replacement of the cams and the rockers, with consequent loss of revenue due to the periodic unserviceability of the associated vehicles. Furthermore, the maximum possible breakaway resistance in this type of arrangement is limited by the coefficient of friction between the cam surfaces. This follows from the fact that if the applied force should equal the frictional resistance sliding will occur on the cam surfaces instead of the motion following the predetermined cam contour.

A primary object of the present invention is to provide a pony or auxiliary truck restoring or centralizing means which is flexible, efficient and has a long useful life. According to the invention, supplementary centralizing means are provided which consist of opposed coil springs arranged between the pony truck frame and certain structure associated with the main frame, preferably with a bolster bearing, said springs being in balance with each other, if precompressed, when the pony truck frame is in its centralized position. While preferably the springs are arranged in compression, still, it is not excluded that they be arranged in tension. Alternately, the springs may be out of contact between the associated two members in central position, and only come into play after a predetermined initial displacement. Such an arrangement is shown in FIGS. 7–9 and the effect is shown in the diagram of resistance characteristic in FIG. 10.

Since there are no rubbing parts with the arrangement herein disclosed, the device of this invention is capable of long and trouble-free service. The disclosed arrangement in some cases may permit locating the pivot pins of the rocker links in rubber bushings. The required longitudinal relative movement between the main frame and the pony truck bolster is accommodated by distortion of the rubber bushings, with the rubber being in shear. Also, friction may be eliminated in such cases.

In the preferred embodiment of the invention, the springs are compression springs arranged between the pivotally supported bolster plate and reaction surfaces provided by the pony truck frame. The characteristics of the springs and their degree of initial compression depend upon the nature of the duty they are called on to fulfill. Any desired variation of resistance with displacement can be achieved.

Preferably the pony truck centralizing springs are so initially compressed as to insure that in use they never come into tension; so that, as the pony truck wheels return towards the centralized position, after large displacement, a cushioning effect results as the balance between the springs is restored, e.g. the bolster is restored to contact with the free springs.

The bearing plate sockets in which the journal bearings on the free ends of the anchor link limbs move are preferably of greater radius than the radius of the cylindrical journal bearing on the rocker links, so that the relative movement is a rolling rather than a rubbing movement.

To maintain the assembly connected otherwise than by gravity, each rocker link may be connected by a web aperture and a cross-pin that is anchored to the pony truck frame with the pin being arranged with clearance under normal operating conditions.

This invention relates to a multi-axle railway truck and particularly to a guided, single axle, auxiliary or pony truck that is adapted to be drivingly connected to a main truck and to be constructed in such a manner that a controlled relative transverse movement between its bolster and truck frame is permitted while means are provided to resist any transverse wandering of the auxiliary truck.

It is a primary object of this invention to provide an auxiliary truck wherein the truck bolster plate is movably mounted on the truck frame by inherently stable bolster support means that permits limited relative transverse movement between the bolter and the associated truck frame under bolster load control.

It is another object of this invention to provide an auxiliary truck having a bolster plate movably mounted on the truck frame such that relative transverse movement between the bolster plate and truck frame requires elevation of the bolster plate load and compression of a resilient means.

It is still another object of one form of this invention to provide a bolster plate movably mounted on a truck frame wherein pivoted rocker link means interconnect the bolster plate and the supporting truck frame such that relative transverse movement between the bolster plate and truck frame is resisted by the vertically applied bolster plate load.

It is still another object of another form of this invention to provide a bolter plate movably mounted on a truck frame wherein ramp and roller means interconnect the bolster plate and supporting truck frame such that relative transverse movement between the bolster plate and truck frame is resisted by the vertically applied bolster plate load.

It is a further object of this invention to provide a pony truck with a transversely shiftable bolster plate that is connected to the truck frame by a camming means and a resilient means that is arranged such that relative transverse movement between the truck frame and its bolster must initially overcome a predetermined gravity breakaway resistance imposed by the truck load and also a variable resistance imposed by the resilient means with said resilient means further functioning as a self centering means to return the bolster to its normally centered position on the pony truck frame and to modify variation of the bolster restoring force with lateral displacement.

Other objects and advantages of this invention will become readily apparent from a reading of the following description and a consideration of the related drawings wherein:

FIG. 1 is a side elevational view of a railway locomotive having a pair of multi-axle trucks that each include an auxiliary or pony truck embodying this invention;

FIG. 2 is an enlarged fragmentary plan view taken as indicated by the arrows 2—2 of FIG. 1 showing the auxiliary truck;

FIG. 3 is a sectional elevational view of the auxiliary truck, the view being taken along the plane indicated by the arrows 3—3 of FIG. 2;

FIG. 4 is a sectional elevational view taken along the line 4—4 of FIG. 2 looking in the direction of the arrows;

FIG. 5 is a side elevational view taken as indicated by the section line 5—5 of FIG. 4;

FIG. 6 is an enlarged, fragmentary, sectional elevational view, similar to FIG. 4, showing a reversed arrangement of the form of the invention shown in FIGS. 1–5;

FIG. 7 is a plan elevation of a modified form of this invention, the view being similar to FIG. 2;

FIG. 8 is a fragmentary sectional elevational view taken along the lines 8—8 of FIG. 7;

FIG. 9 is an end elevational view looking in the direction of the arrows 9—9 of FIG. 7; and FIG. 10 is a graph of the force required to cause lateral displacement of the auxiliary truck bolster.

This invention relates to auxiliary or pony trucks that are adapted to be link connected to a railway main truck to assist in supporting the load applied to the main truck. Means must be provided on the auxiliary truck to permit some relative transverse movement between the auxiliary truck frame and the bolster plate mounted thereon so that the truck wheel and axle assemblies may shift to accommodate movement along curved track sections.

FIG. 1 shows a railway locomotive 10 that has its frame 11 supported on the main trucks 12, 13 by means of center bearings 14, 15 respectively. Each of the main trucks 12 and 13 is identical although they are arranged with their pony truck ends extending in opposite directions lengthwise of the locomotive. This is thought to be quite obvious as the pony or auxiliary truck 16 on the front end main truck 12 is at the front end of the main truck 12 whereas the pony or auxiliary truck 17 of the rear end main truck 13 is located at the rear end of main truck 13. This reversed arrangement of the trucks 12, 13 is necessary in order to have a pony or auxiliary truck as a leading truck in both forward and reverse movement of the locomotive.

Each of the multi-axle main trucks 12, 13 include a main frame 20 that has three sets of pedestal legs 21 that each receive a journal box 22 of a wheel and axle assembly. Each main frame 20 also includes a longitudinally projecting end portion 23 that is connected by a center bearing 25 to the associated auxiliary truck 16 or 17. Frame center bearing 25 seats in a mating bearing plate 26 on the bolster plate 27 of the auxiliary truck 16.

The auxiliary truck 16 comprises a conventional wheel and axle assembly 30 that has journal boxes 32 mounted on its opposite ends. The journal boxes 32 are slidably mounted for vertical movement between the pedestal legs 33 on opposite sides of the truck frame 34. Mounted on the top of each journal box 22 is a coil spring 28 that extends upward into an overlying seat 29 formed in the truck frame 34. It is thought to be obvious that springs 28 support the truck load on the journal boxes 22.

The frame 34 is substantially I-shaped in plan configuration (see FIG. 2) with openings 35 at each end to receive the truck wheels and a central platform portion 37 that supports the truck bolster plate 27. Mounted on the truck frame platform portion 37 are two pairs of rocker plates 38 and 39 respectively. Rocker plates 38 and 39 are anchored to the truck platform portion 37 by bolts 40.

Seated on each of the pairs of rocker plates 38 and 39 are triangularly-shaped or V-shaped rocker links 42 and 43 respectively. Links 42 and 43 have their base portions formed with pairs of cylinder-like rocker portions 44 and 45 respectively. The rocker portions 44 and 45 tend to support the links 42 and 43 in stable vertical positions. Each of the links 42 and 43 has an opening 46 extending transversely therethrough. Extending through the openings 46 in the links 42, 43 and through apertures in upstanding ears 48 on the rocker plates 38, 39 are anchor pins 47. Pins 47 prevent the rocker links 42, 43 from becoming disengaged from the truck rocker plates 38, 39. However, the openings 46 in the links 42, 43 are sufficiently larger than the diameter of the pins 47 to permit the rocker links 42, 43 to have a limited transverse rocking movement relative to the truck frame 34.

The apex or upper end of each of the rocker links 42, 43 is pivotally connected by means of a resilient bushing 50 to a pivot pin 51 carried by the bolster plate 27. Located between each pair of links 42, 43 and extending transversely of the truck frame 34 are compression springs 55 that tend to oppose transverse movement of the rocker plate 27 with respect to the truck frame 34. Springs 55 extend horizontally between seats 56 on the underside of the rocker plate 27 and seats 57 on upstanding flanges 58 of the truck frame 34. Tie rods 59 are mounted in the truck frame flanges 58 so as to extend axially through the compression springs 55. The tie rods 59 have anchor units 60 on their inner ends that limit the amount of transverse movement of the bolster plate 27 with respect to the truck frame 34. It will be noted that the openings 61 in spring seats 56 will permit limited vertical movement of the bolster plate 27 with respect to the truck frame 34.

As previously pointed out, the auxiliary or pony truck 16 is connected to the main truck 12 through the center bearing connection 25, 26. In addition, thrust links 62 are pivotally connected at 63 to the auxiliary truck 16 and similarly connected at the opposite ends to the main truck 12.

FIG. 6 shows a modified form of this invention wherein the bolster plate supports links 42' (only one shown) are identical to those shown in FIGS. 1–5 but wherein the links 42' are inverted. In the form of the invention shown in FIG. 6 the apex end 84 of the V-shaped or triangularly-shaped link 42' is pivotally connected to the platform portion 37 of the truck frame 34 by resiliently bushed pivot pin 81. The spaced-apart, link upper end, rocker portions 82 and 83 of the rocker link 42' are arranged to journal in bearing portions 86 of the seating plate 87. Seating plate 87 is bolted to the underside of the bolster plate 27 by the screws 88. Link 42' has an aperture 89 therethrough that loosely receives the anchor pin 91 that is fixed to the underside of the bolster plate 27. Compression springs 92 that are seated on the truck frame portions 93 and react against the flange seats 95 on the underside of the bolster plate 27 provide means that resiliently opposes relative transverse movement between the bolster plate 27 and the truck frame 34. This form of the invention functions as the FIGS. 1–5 form. However, by having the rocker plates 87 mounted in an inverted position at the top of the links it is not possible for dirt or other foreign matter to accumulate in the rocker bearing portions 86 and adversely affect the camming operation of the rocker link 42'.

FIG. 7–9 show a third form of this invention wherein a roller and ramp means 70 is used to control the relative transverse movement between the auxiliary truck bolster plate 71 and the associated truck frame 72. The parts of the auxiliary truck 16 shown in FIGS. 7–9 that are identical to those previously described with respect to the FIGS. 1–5 form of this invention bear the same reference numeral as in the other forms. Repetition of the description of these identical parts will be omitted and only the new structure will be specifically described.

The underside of the bolster plate 71 is provided with four sets of depending ears 74 that mount the axles 75 for the roller wheels 76. The axles 75 extends longitudinally of the truck so that the roller 76 will be positioned to roll transversely of the truck on the ramp blocks 77. The ramp blocks 77 are mounted on the depressed central platform portion 78 of the truck frame 72 by means of the bolts 79. The ramp blocks 78 have V-shaped ramp surfaces 80 that normally seat the roller 76 in their apex portion. It will be seen from FIG. 9 that on transverse movement of the bolster plate 71 on the truck frame 72 the rollers 76 must roll up the incline of the ramp blocks 77 which in this instance lie at an angle $\phi$ from the horizontal.

In the form of the invention shown in FIGS. 7–9 the underside of the bolster plate 71 is provided with spring receiving recesses 90 at each side. Each recess includes an inner wall portion 91 that seats the inner end of a compression spring 155. Also mounted on each wall 91 and projecting through each recess 90 is a stemmed plunger 92. Plunger 92 has its stem slidably mounted in the associated wall 91 and the head of the plunger 92 projects outwardly beyond the side 93 by a distance indicated by the letter B in FIG. 9. The heads of the plungers 92 are normally spaced from the side face 94 of the truck frame 72 by the distance indicated by the letter A in FIG. 9. The force required to overcome breakaway friction and initially cause relative transverse movement of the bolster plate 71 with respect to the truck frame 72 by rolling the rollers 76 up one of the ramp surfaces 80 is opposed by the load applied to the bolster plate through the bearing 25, 26. During initial relative transverse movement of the bolster plate 71 relative to frame 72 through the distance A the movement opposing force is essentially just the gravity load applied through bearing 25, 26. However, when the head of the plunger 92 engages the face 94 of the truck frame then an increased movement opposing load or force of spring 155 is applied to the bolster plate 71 as clearly shown by the graph in FIG. 10. It is thought that the graph of FIG. 10 is self explanatory. Obviously if the springs 155 and plungers 92 were omitted then the movement opposing force would level off as shown by the line 96 on the graph of FIG. 10. However, when springs 155 and plungers 92 are used then the movement opposing force increases when the springs 155 become active by engagement of the plunger heads with the frame faces 94. Line 97 on the graph of FIG. 10 is thought to clearly bring out this action.

Suitable bumper means 102 can be arranged between the bolster plate 71 and the surrounding truck frame 72 to limit fore and aft movement of the bolster plate 71 relative to the truck frame 72. A safety linkage is also provided to prevent complete disengagement of the bolster plate 71 from the truck frame 72. This linkage comprises depending ears 101 on the bolster plate 71 that carry pins 102 that are loosely engaged in slots 104 in upstanding ears 105 on the truck frame portions 78.

It is thought to be obvious from a consideration of FIGS. 7–9 that the rollers 76 will normally seek the low point or apex of the V-shaped ramp surfaces 80 so that the bolster plate 71 will be centered transversely of the truck frame 72. This will be the normal position of the bolster plate 71 when the truck 16 is being pushed or pulled along a relatively straight track section. When the truck proceeds along a curved track section there is a tendency for the wheel and axle assemblies 30 and the connected truck frame 72 to shift transversely with respect to the bolster plate 71 and under such circumstances the rollers 76 will be forced to roll up the ramps 80 and in so doing their movement is opposed by the bolster plate load and breakaway friction initially and thereafter by the springs 155 if the lateral displacement is sufficient to cause movement of the plate 71 through at least the distance A shown in FIG. 9. Provision of the springs 155 permits readily changeable variations in the resistance characteristics of the auxiliary truck. Furthermore abrupt changes in resistance can be accomplished by the use of the springs 155 whereas such changes can not be practically accomplished with cam mechanisms. The changing of springs 155 or variation in their degree of precompression is a relatively simple change whereas changing a cam design is quite difficult and expensive when a truck is in service.

As regards the form of the invention shown in FIGS. 7–9, it is contemplated that the mere inversion of the rollers and cams 76, 77 is within the scope of this invention. Thus the rollers 76 could be mounted on the frame portion 78 and the cam plates 77 could be carried by the underside of the bolster plate 71. The action of the inverted arrangement would be the same as with the arrangement shown in FIGS. 7–9.

It is also within the scope of this invention to have the springs 155 in the FIGS. 7–9 form of the invention extend from the bolster plate 71 to the frame 72 so that there is a constantly acting spring force to center the bolster plate and modify the resistance characteristics of the truck bolster.

I claim:
1. In a railway vehicle truck, wheels, an axle, a frame resiliently supported from said axle, a member pivoted on said frame on an axis extending longitudinally of the truck, said member having a surface remote from said pivot axis, a laterally movable bolster normally centered laterally of the truck and carried by and in frictional engagement with said surface, the pivot for said member including torsionally resilient means having relatively movable portions fixed respectively to said frame and said member whereby to oppose pivoting of said member relative to said frame.

2. In a railway vehicle truck, a resiliently-supported frame structure, load-supporting bolster structure, one of said structures mounting a cylindrical member extending longitudinally of the truck, a rubber-like annulus surrounding said cylindrical member and held against rotation relative thereto, a pivoted member having a cylindrical opening fixedly receiving said annulus, said pivoted member also having a surface remote from said cylindrical member, said other structure having a substantially horizontal surface in frictional engagement with said remote surface, said annulus being yieldable in torsional shear whereby to accommodate and yieldingly oppose pivoting of said pivoted member about said cylindrical member responsive to forces tending to move said bolster and frame structures transversely of the truck relative to each other and to urge the pivoted member and said bolster structure toward their normal centered positions.

3. In a railway truck comprising a wheeled axle assembly, a truck frame member resiliently supported on said axle assembly for vertical movement relative thereto, a bolster frame member supported on said truck frame member by linkage means providing for vertical and transverse movement of the bolster frame member relative to the truck frame member, said linkage means comprising a vertically disposed, triangularly shaped rocker link extending transversely of the truck frame member, said triangularly shaped rocker link having a bore extending transversely through the apex end thereof and arcuate rocker bearing surfaces formed on the opposite ends of the base side of the triangularly shaped, rocker link, a pivot pin extending through the bore in the apex end of said rocker link and journaled on one of said frame members with said pivot pin having a resilient bushing tightly filling the annular span between the pivot pin and the bore peripheral wall to provide a resilient sleeve that is torsionally stressed during relative transverse movement between said frame members, and said other frame member having a bearing surface seating and rockably supporting the arcuate rocker link bearing surfaces.

References Cited in the file of this patent

UNITED STATES PATENTS

| | | |
|---|---|---|
| 1,117,294 | Wilson | Nov. 17, 1914 |
| 1,486,661 | Hall | Mar. 11, 1924 |
| 1,884,801 | Meyer et al. | Oct. 25, 1932 |
| 2,279,793 | Leppla | Apr. 14, 1942 |
| 2,402,711 | Travilla | June 25, 1946 |
| 2,405,398 | Buckwalter | Aug. 6, 1946 |
| 2,466,088 | Endsley | Apr. 5, 1949 |
| 2,551,064 | Spenner | May 1, 1951 |
| 2,630,079 | Cottrell | Mar. 3, 1953 |
| 2,829,605 | Kell et al. | Apr. 8, 1958 |
| 2,981,207 | Paulsen | Apr. 25, 1961 |